No. 663,803. Patented Dec. 11, 1900.
C. A. BLUHM.
INCANDESCENT GAS BURNER.
(Application filed Mar. 24, 1900.)
(No Model.)
Fig. 1.
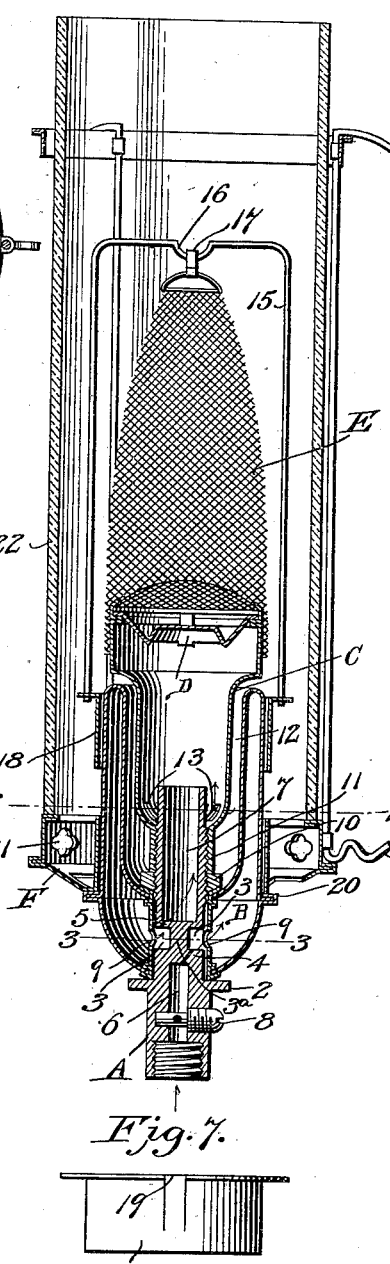
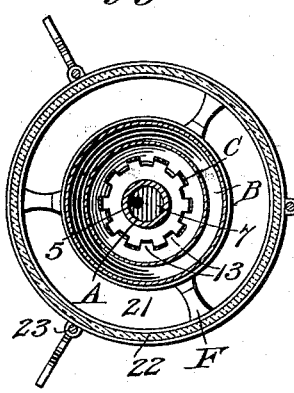
Fig. 2.
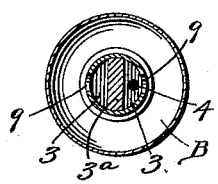
Fig. 3.
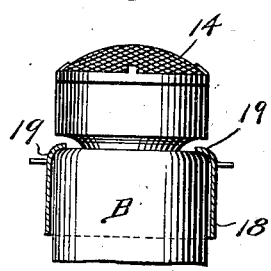
Fig. 4.
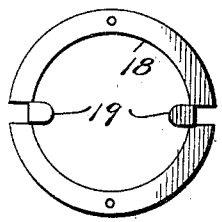
Fig. 5.
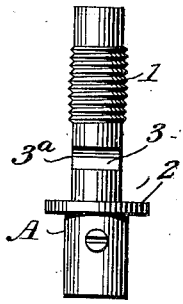
Fig. 6.
Fig. 7.
Witnesses
Edwin G. McKee
Ralph H. Warfield
Inventor
Charles A. Bluhm.
by Rhesa G. & Boiet Co.
his Attorneys
THE NORRIS PETERS CO., PHOTO-LITHO., WASHINGTON, D. C.

UNITED STATES PATENT OFFICE.

CHARLES A. BLUHM, OF MICHIGAN CITY, INDIANA.

INCANDESCENT GAS-BURNER.

SPECIFICATION forming part of Letters Patent No. 663,803, dated December 11, 1900.

Application filed March 24, 1900. Serial No. 10,081. (No model.)

*To all whom it may concern:*

Be it known that I, CHARLES A. BLUHM, a citizen of the United States of America, residing at Michigan City, in the county of La Porte and State of Indiana, have invented a certain new and useful Improvement in Incandescent Gas-Burners, of which the following is a specification.

My invention relates to an improvement in incandescent gas-burners.

The object to be attained in an incandescent gas-burner is heat and, as far as possible, to carry the heat to the top or highest point of the mantle in connection with a proper circulation of air, where it should remain without variation of light as long as the gas is turned on. Failure to recognize this point has resulted in lack of success in the construction of many, if not all, of the incandescent gas-burners at present on the market. The reason for this is that they are all regulated by cold-air drafts at the bottom, and as there are variations in the quality of air, and as dampness is present to a greater or less degree in the air, as generally fed to the burner, so that a variation in the light results, the damp air being constantly carried into the combustion-chamber by the cold-air draft at the bottom of the burner, thereby producing in connection with the cold damp gas a gloomy light and at times only a partial lighting of the mantle. It is an object of my present invention to overcome this objection of the introduction of a cold-air draft and the dampness of the air by constructing a preheating gas-chamber and a hot-air draft for the combustion and mixing chambers. In the first place the gas enters the preheating chamber or space, where the dampness of gas is removed by passing in and through this preheating-space, making the gas pure and light. The heating of the preheating chamber or space results from the hot air constantly passing between it and the combustion-chamber, which circulation is kept up as long as the gas is turned on. In the second place after the gas leaves the preheating-chamber it enters the combustion and mixing chamber, where it is mixed with light hot air taken in through the hot-air draft-space surrounding the combustion-chamber through holes in the bottom of the combustion-chamber for the purpose. In the third place the hot-air draft is created by the flame itself after the gas is turned on. The flame being located at the top of the burner in connection with the mantle and being the hottest point and the draft-openings surrounding the combustion-chamber being located below at a point where the heat is not so strong gives way to the heat above, and thereby causes a constant circulation of hot air surrounding and entering the combustion and mixing chamber at the bottom through the draft-openings. In the fourth place the space between the preheating and combustion chambers may be increased or decreased by screwing up or down the combustion-chamber for the regulation of the hot-air draft. In the fifth place a perfect regulation is provided for the flame of my burner in order to give the desired light by means of a set-screw, the valve of which can be set when once adjusted. Again, the invention consists in a pillar which receives and distributes the gas and constitutes a part of the preheating and combustion chambers.

The invention further consists in a double-wire support for the mantle, holding the mantle in the center and preventing it from being burned out at one side, which is frequently the case where a single wire is employed. Finally, the invention consists in means for supporting this wire and mantle, which is capable of being easily removed from the burner when occasion may require the renewal of the mantle.

Also, my invention consists in certain novel features of construction and combinations of parts, which will be hereinafter described, and pointed out in the claims.

In the accompanying drawings, Figure 1 is a view in vertical section of my improved burner, showing the mantle and chimney in place thereon. Fig. 2 is a horizontal section on line 2 2 of Fig. 1. Fig. 3 is a horizontal section on line 3 3 of Fig. 1. Fig. 4 is a view in elevation of the burner. Fig. 5 is a plan view. Fig. 6 is a view of the pillar, and Fig. 7 is a detail.

A represents the gas-pillar, it being internally threaded at the lower end for attachment to the gas-fixture and externally threaded at the upper end, as at 1, for the attachment of the burner, as will be hereinafter described. The pillar is provided with a circumferential flange or shoulder 2, upon which the preheating-chamber, to be described, rests. It is recessed at 3 3 for the passage of gas on each side of the partition 3ª, which separates said recesses 3 3, and is provided with ducts 4 and 5, leading from the lower bore 6 to one of the recesses 3 and to the upper bore 7 from the other recess 3, respectively. A flange 8, in the form of a screw, is adapted to be set to regulate the feed of gas through the burner.

B indicates a preheating-chamber which surrounds the pillar and, as stated, rests at its lower end upon the flange 2 of the pillar. This preheating-chamber preferably extends upwardly some distance above the upper end of the pillar and is provided with perforations 9 for the passage of gas into and out of this preheating-chamber. The preheating-chamber and pillar are held together by a nut 10, which turns on a thread 1 of the pillar until it engages the preheating-chamber and locks it securely between it and the annular flange 2 on the pillar.

C indicates the shell of the mixing-chamber. This chamber is restricted at its lower end and provided with internal screw-threads 11, which turn down upon the external threads of the pillar and hold the mixing-chamber in position thereon. The space 12 between this mixing-chamber and the preheating-chamber constitutes an extended or circuitous air-inlet through which all of the air for supporting combustion is drawn and supplied, and this air issues through the slots 13 13, arranged in an annulus around the protruding end of the pillar, where it is adapted to mix with the gas issuing from the pillar at this point. The object of this arrangement, whereby the mixing-chamber is screwed to the pillar, is to afford a vertical adjustment of the mixing-chamber with respect to the preheating-chamber, whereby the size of the annular air-space 12 is regulated to supply a greater or less quantity of air, as required to mix with the gas and support combustion. In consequence of this juxtaposition and arrangement the air-space 12 is kept constantly and uniformly heated, and in like manner the preheating-chamber in which the gas circulates is kept heated from the heated film of air, thus eliminating dampness from the gas contained in said preheating-chamber, and also causes it to expand and issue through the duct 5 into the mixing-chamber C, where the gas and air commingle and unite to supply the burner above.

D represents a spreader, which rests at the upper end of the mixing-chamber and spreads the commingled gas and air. Over this the convexed wire screen or cap 14 is placed.

The incandescent mantle E depends from a point sufficiently high above the burner, as shown at the loop 16, conveniently by means of an S-shaped hook 17, and this double wire is mounted upon a flanged ring 18, which surrounds the superheated chamber, where it is held by means of spring-hooks 19. In this way the mantle is held centrally in place against accidental displacement, so that it is heated uniformly throughout its area, and in this way the mantle may be easily removed at any time.

F is a gallery, which rests upon a flange 20 on the exterior of the preheating-chamber. This gallery has air-passages 21, and it is adapted to support the chimney 22 and is provided with a shade-support 23.

From the foregoing it will be seen that the parts can be easily removed and adjusted, the requisite quantity of gas regulated, the supply of air graduated, and at the same time both the air and gas are heated before mixing and the natural dampness of the gas is eliminated. Also it will be seen that the mantle is held firmly in an upright position, where it stands in the flame uniformly throughout its surface. Likewise, it will be observed, the parts are so constructed that they may be not only adjusted with facility, but, furthermore, they can be dismembered and the entire burner dismantled or assembled with perfect ease and convenience.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a pillar, and a gas-burner, of a preheating-chamber heated by a flame from the burner, through which preheating-chamber the gas passes on its way to the burner, said preheating-chamber closed at its upper end and opening at its lower end into the pillar.

2. The combination with a pillar, and a gas-burner, of an annular preheating-chamber heated by a flame from the burner, through which preheating-chamber the gas passes on its way to the burner, said preheating-chamber closed at its upper end and opening at its lower end into the pillar.

3. The combination with a pillar provided with a pair of external recesses separated by an intermediate partition, and a burner, of a preheating-chamber to which gas is supplied through one of said recesses and from which it issues into the other recess.

4. The combination with a pillar having two distinct bores and provided with a pair of external recesses separated by an intermediate partition, and a burner supported on said pillar, of a preheating-chamber heated by the burner-flame and which receives gas from the lower bore and discharges it into the upper bore of the pillar.

5. The combination with a pillar having a flange or shoulder thereon and provided with screw-threads, of an annular preheating-cham ber mounted on the pillar and resting on the said flange or shoulder and a nut adapted to turn on said threads and lock the preheating-chamber in position between it and the flange or shoulder.

6. The combination with a pillar having a shoulder thereon, of a preheating-chamber and a slotted mixing-chamber adjustable upon said pillar whereby to regulate the size of the space between said mixing-chamber and the preheating-chamber for the passage of air therethrough.

7. The combination with a pillar having external screw-threads thereon, of a preheating-chamber and a mixing-chamber held on said pillar the latter adapted to screw up and down thereon whereby to regulate the space between the two for the inlet of air into the mixing-chamber.

8. The combination with a pillar having two distinct bores, a pair of external recesses, a partition between said recesses, and ducts for communication between said recesses and bores, of an annular preheating-chamber, and a slotted mixing-chamber mounted on said pillar, the former having holes which communicate with the recesses in the sides of the pillar, and the mixing-chamber adjustable upon the pillar whereby to regulate the size of the space between it and the combustion-chamber.

9. The combination with a pillar and a preheating-chamber, of a ring removably secured to said preheating-chamber, a double wire attached to and supported by said ring and a mantle suspended therefrom.

10. The combination with a pillar and a preheating-chamber, of a ring removably secured to said preheating-chamber, a double wire attached to and supported by said ring, a mantle suspended therefrom and a spring device connected with said ring for attaching it to the preheating-chamber.

In testimony whereof I have signed my name to this specification in the presence of two subscribing witnesses.

CHARLES A. BLUHM.

Witnesses:
HENRY H. BLUHM,
JOHN ROZEAN.